United States Patent
Funakou et al.

(10) Patent No.: US 12,455,977 B2
(45) Date of Patent: Oct. 28, 2025

(54) DISPLAY CONTROL APPARATUS, DISPLAY CONTROL METHOD, AND COMPUTER READABLE MEDIUM

(71) Applicant: NEC Corporation, Tokyo (JP)

(72) Inventors: Hisanao Funakou, Tokyo (JP); Yoichiro Ito, Tokyo (JP); Hiroyuki Toyama, Tokyo (JP); Hiroaki Miyoshi, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 389 days.

(21) Appl. No.: 18/015,299

(22) PCT Filed: Jul. 14, 2020

(86) PCT No.: PCT/JP2020/027407
§ 371 (c)(1),
(2) Date: Jan. 9, 2023

(87) PCT Pub. No.: WO2022/013952
PCT Pub. Date: Jan. 20, 2022

(65) Prior Publication Data
US 2023/0342490 A1    Oct. 26, 2023

(51) Int. Cl.
*G06F 21/62* (2013.01)
*G06V 40/10* (2022.01)
(Continued)

(52) U.S. Cl.
CPC .......... *G06F 21/6245* (2013.01); *G06V 40/10* (2022.01); *G09G 3/20* (2013.01);
(Continued)

(58) Field of Classification Search
CPC ...... G06F 21/6245; G06V 40/10; G09G 3/20; G09G 2320/0626; G10L 17/02; G10L 17/06
See application file for complete search history.

(56) References Cited

U.S. PATENT DOCUMENTS

| 9,684,804 B2 * | 6/2017 | Cohen ..................... G06F 3/005 |
| 2010/0124363 A1 | 5/2010 | Ek et al. |

(Continued)

FOREIGN PATENT DOCUMENTS

| JP | 2008-217675 A | 9/2008 |
| JP | 2009-080668 A | 4/2009 |

(Continued)

OTHER PUBLICATIONS

International Search Report for PCT Application No. PCT/JP2020/027407, mailed on Oct. 20, 2020.

(Continued)

*Primary Examiner* — Hee K Song

(57) ABSTRACT

A display control apparatus (2000) detects, by using audio data including a sound around a display device (10), a first situation where target information being displayed by the display device (10) can be viewed by a person other than a specific person (30), or detects, by using image data including surroundings of the display device (10), a second situation where the target information being displayed by the display device (10) can be captured by a camera. The display control apparatus (2000) changes an output state of the target information in the display device (10) in response to detection of the first situation or the second situation. A change of the output state is processing of stopping output of the target information or processing of reducing visibility of the target information as compared with visibility before a change.

24 Claims, 5 Drawing Sheets

(51) Int. Cl.
*G09G 3/20* (2006.01)
*G10L 17/02* (2013.01)
*G10L 17/06* (2013.01)

(52) U.S. Cl.
CPC .............. *G10L 17/02* (2013.01); *G10L 17/06* (2013.01); *G09G 2320/0626* (2013.01)

(56) References Cited

U.S. PATENT DOCUMENTS

| | | | |
|---|---|---|---|
| 2014/0189784 | A1 | 7/2014 | Marino et al. |
| 2015/0170446 | A1* | 6/2015 | Burba ...................... G07C 9/32 340/5.52 |
| 2016/0300081 | A1* | 10/2016 | Weksler ................ H04W 4/027 |
| 2020/0159937 | A1* | 5/2020 | Schondorf ............ G06F 21/554 |
| 2021/0182440 | A1* | 6/2021 | Singh .................. G06F 21/6245 |

FOREIGN PATENT DOCUMENTS

| | | |
|---|---|---|
| JP | 2009-140051 A | 6/2009 |
| JP | 2010-122754 A | 6/2010 |
| JP | 2010-278852 | 12/2010 |
| JP | 2011-134137 A | 7/2011 |
| JP | 2016-503208 A | 2/2016 |
| JP | 2016-177464 A | 10/2016 |
| JP | 2017-016590 A | 1/2017 |
| JP | 2019-137972 A | 8/2019 |
| WO | 2018/084835 A1 | 5/2018 |

OTHER PUBLICATIONS

Anzai, Taiki et al., "Proposal of Personal Authentication Technique Based on Images", Journal of the Institute of Image Electronics Engineers of Japan, vol. 38, No. 5, Sep. 25, 2009, pp. 608-613, p. 609, 1. 21-29.

JP Office Action for JP Application No. 2024-051858, mailed on Nov. 12, 2024 with English Translation.

* cited by examiner

DISPLAY CONTROL APPARATUS, DISPLAY CONTROL METHOD, AND COMPUTER READABLE MEDIUM

This application is a National Stage Entry of PCT/JP2020/027407 filed on Jul. 14, 2020, the contents of all of which are incorporated herein by reference, in their entirety.

TECHNICAL FIELD

The present invention relates to a technique for preventing leakage of information.

BACKGROUND ART

Some information handled for work and the like is permitted to be viewed by only limited people. Examples of the information include information that are permitted to be viewed by only people in a single company or group, and so on. When handling information that is permitted to be viewed by only limited people, it is necessary to prevent the information from being viewed by a person who is not permitted to view it, thereby preventing it from being leaked.

Thus, a system for preventing information from being viewed by a person who is not permitted to view it has been developed. For example, Patent Literature 1 discloses a technique of determining, by using a camera, whether a user of a digital device is a person who has a permission for use, and controlling display of a display screen in response to the determination. More specifically, the digital device in Patent Literature 1 determines whether a user is a person who has a permission for use by comparing a face image of the user of the digital device being acquired from the camera with a face image of a person who has the permission for use. Then, when it is determined that the user is not a person who has the permission for use and that a sight of the user is directed toward the display screen, visibility of an image being displayed on the display screen is reduced.

Patent Literature 2 discloses a technique of changing display of a display screen to an indecipherable state when a person other than an operator is detected by a human detecting sensor. The human detecting sensor is provided in such a way as to perform detection of a person within a range that is a predetermined range around the display screen and in which there is no operator.

CITATION LIST

Patent Literature

[Patent Literature 1] International Patent Publication No. WO2018/084835
[Patent Literature 2] Japanese Unexamined Patent Application Publication No. 2010-122754

SUMMARY OF INVENTION

Technical Problem

A situation where information being displayed on a display screen leaks is not limited to a situation where a person who does not have a permission for use is captured by a camera that captures surroundings of the display screen and a situation where a person other than an operator is detected by a human detecting sensor that detects a person around the display screen.

The present invention has been made in view of the problem described above, and one of objects of the present invention is to provide a novel technique for preventing leakage of information being displayed on a display screen.

Solution to Problem

A display control apparatus according to the present disclosure includes: a detection unit configured to detect, by using audio data including a sound around a display device, a first situation where target information being displayed by the display device can be viewed by a person other than a specific person, or detect, by using image data including surroundings of the display device, a second situation where the target information being displayed by the display device can be captured by a camera; and a state change unit configured to change an output state of the target information in the display device in response to detection of the first situation or the second situation.

A change of the output state is processing of stopping output of the target information or processing of reducing visibility of the target information as compared with visibility before the change.

A display control method according to the present disclosure is executed by a computer. The display control method includes: a detection step of detecting, by using audio data including a sound around a display device, a first situation where target information being displayed by the display device can be viewed by a person other than a specific person, or detecting, by using image data including surroundings of the display device, a second situation where the target information being displayed by the display device can be captured by a camera; and a state change step of changing an output state of the target information in the display device in response to detection of the first situation or the second situation.

A change of the output state is processing of stopping output of the target information or processing of reducing visibility of the target information as compared with visibility before the change.

A computer readable medium according to the present disclosure stores a program causing a computer to execute the display control method according to present disclosure.

Advantageous Effects of Invention

The present invention provides a novel technique for preventing leakage of information being displayed on a display screen.

EXAMPLE EMBODIMENT

Hereinafter, example embodiments of the present disclosure will be described in detail with reference to drawings.

In each of the drawings, the same or corresponding elements will be denoted by the same reference signs, and duplicate description will be omitted depending on need for the sake of clarity of explanation.

Figure 1:
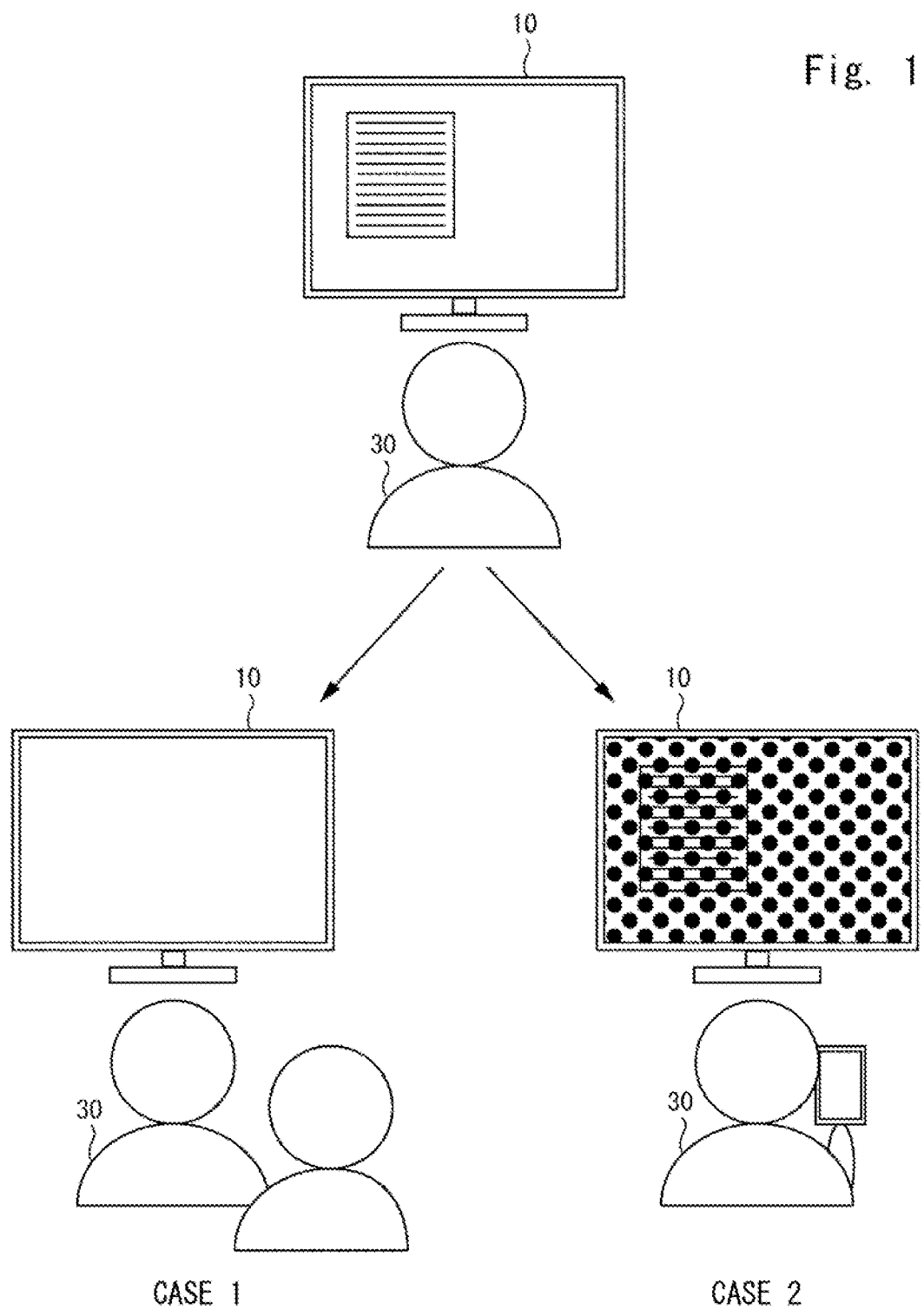
FIG. 1 is a diagram illustrating an outline of a display control apparatus according to a first example embodiment.

FIG. 1 is a diagram illustrating an outline of a display control apparatus (a display control apparatus 2000 in FIG. 2 described below) according to a first example embodiment. Note that the following description with reference to FIG. 1 is for facilitating understanding of the display control apparatus 2000 according to the first example embodiment, and operations of the display control apparatus 2000 according to the first example embodiment is not limited to operations in the following description.

The display control apparatus 2000 performs control of display of information by a display device 10. Hereinafter, information of which display is controlled by the display control apparatus 2000 is referred to as target information. The target information may be all information being displayed on the display device 10 or may be a part of the information. The target information is information that needs to be prevented from being viewed by a person other than a person permitted to view it. For example, it may be information that is permitted to be viewed by only an employee, that is permitted to be viewed by only a specific group, and the like.

The display control apparatus 2000 detects 1) a first situation in which there is a risk that the target information being displayed on the display device 10 is viewed by a person other than a specific person 30, or 2) a second situation in which there is a risk that the target information being displayed on the display device 10 is captured by a camera. Note that the display control apparatus 2000 may be configured to detect only one of the two situations, or may be configured to detect both. Hereinafter, the first situation and the second situation are also collectively expressed as a "predetermined situation". Note that a plurality of the specific persons 30 may be defined.

Detection of the first situation and the second situation is performed by using sensor data being acquired from a sensor 20. The sensor 20 is provided so as to acquire, as the sensor data, data about a situation around the display device 10. For example, the sensor 20 is a camera, a microphone, or the like. When the sensor 20 is a camera, the sensor data are image data or video data. When the sensor 20 is a microphone, the sensor data are audio data.

When the first situation or the second situation is detected by using the sensor data, the display control apparatus 2000 performs control so as to change an output state of the target information by the display device 10. The change of the output state is processing to make it unable to view the target information or a process to make it difficult to view the target information. The former is, for example, processing to stop the display device 10 displaying the information. The latter is, for example, processing to lower brightness of the display of the display device 10 or add change to the display.

For example, in Case 1 in FIG. 1, the first situation is detected in response to a person other than the specific person 30 appearing in a position where the person can view the display device 10. As a result, information is not displayed on the display device 10. In Case 2 in FIG. 1, the second situation is detected in response to the specific person 30 attempting to capture information being displayed on the display device 10 with a camera of a smartphone. As a result, control processing of superimposing a dot pattern on the information being displayed on the display device 10 is performed.

Note that, in FIG. 1, the control of the display in the case where the first situation is detected is different from that in the case where the second situation is detected for a purpose of illustrating variations of the control of the display. However, the control of the display in the case where the first situation is detected may be the same as that in the case where the second situation is detected.

As described above, the display control apparatus 2000 according to the present example embodiment detects 1) a situation where there is a risk that the target information being displayed on the display device 10 is viewed by a person other than the specific person 30, or 2) a situation where there is a risk that the target information being displayed on the display device 10 is captured by a camera, and in response to the detection, can make it unable to view the target information being displayed on the display device 10 or can lower visibility of the target information. In this way, leakage of the target information being displayed on the display device 10 can be prevented.

Hereinafter, the display control apparatus 2000 according to the present example embodiment will be described in more detail.

<Example of Functional Configuration>

Figure 2:
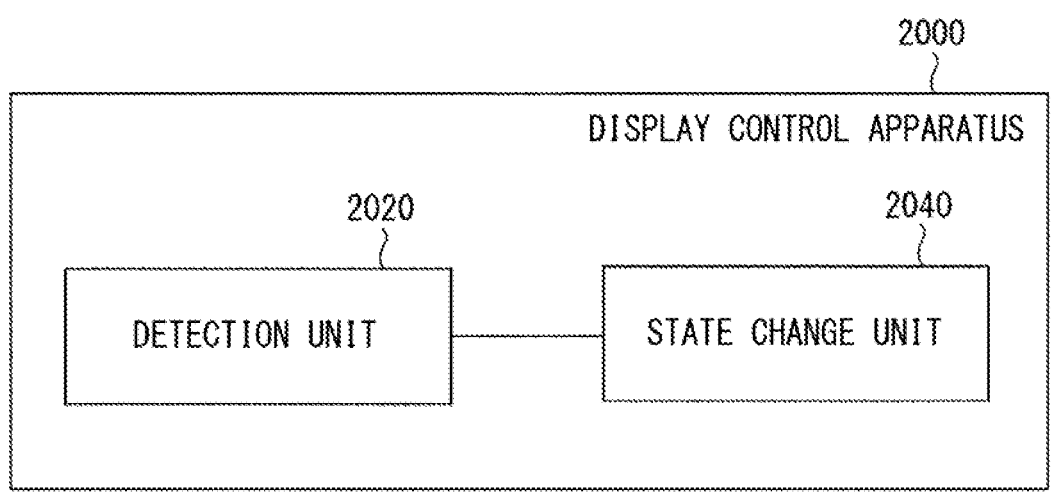
FIG. 2 is a block diagram illustrating a functional configuration of the display control apparatus.

FIG. 2 is a block diagram illustrating a functional configuration of the display control apparatus 2000. The display control apparatus 2000 includes a detection unit 2020 and a state change unit 2040. The detection unit 2020 detects whether the target information being displayed by the display device 10 is in a predetermined situation (the first situation or the second situation) by using the sensor data being acquired from the sensor 20. The state change unit 2040 performs control in such a way as to change an output state of the target information in the display device 10 in response to the detection described above. The output state after the change is a state where the target information is not displayed or a state where visibility of the target information is lower than that before the change.

<Example of Hardware Configuration>

Each functional component unit of the display control apparatus 2000 may be achieved by hardware (for example, a hard-wired electronic circuit, and the like) that achieves each functional component unit, and may be achieved by a combination of hardware and software (for example, a combination of an electronic circuit and a program that controls the electronic circuit, and the like). Hereinafter, a case where each functional component unit of the display control apparatus 2000 is achieved by the combination of hardware and software will be further described.

Figure 3:
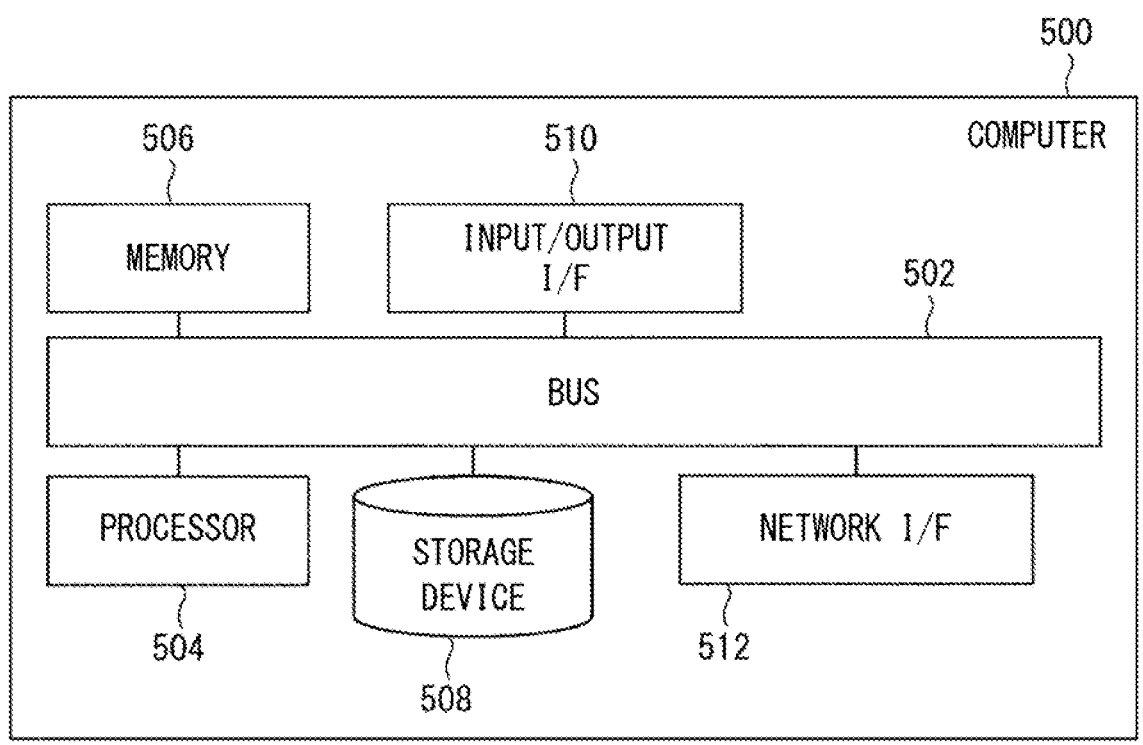
FIG. 3 is a block diagram illustrating a hardware configuration of a computer that achieves the display control apparatus.

FIG. 3 is a block diagram illustrating a hardware configuration of a computer 500 that achieves the display control apparatus 2000. The computer 500 is arbitrary computer. For example, the computer 500 is a stationary computer such as a personal computer (PC) and a server machine. In another example, the computer 500 is a mobile computer such as a smartphone and a tablet terminal. In another example, the computer 500 may be a controller built in the display device 10. The computer 500 may be a dedicated computer designed for achieving the display control apparatus 2000, and may be a general-purpose computer.

For example, each function of the display control apparatus 2000 is achieved in the computer 500 by installing a predetermined application into the computer 500. The application described above is formed of a program for achieving each functional component unit of the display control apparatus 2000.

The computer 500 includes a bus 502, a processor 504, a memory 506, a storage device 508, an input/output interface 510, and a network interface 512. The bus 502 is a data transmission path for allowing the processor 504, the memory 506, the storage device 508, the input/output interface 510, and the network interface 512 to transmit and receive data with one another. However, a method for connecting the processor 504 and the like to one another is not limited to bus connection.

The processor 504 is various types of processors such as a central processing unit (CPU), a graphics processing unit (GPU), or a field-programmable gate array (FPGA). The memory 506 is a main storage device achieved by using a random access memory (RAM) and the like. The storage device 508 is an auxiliary storage device achieved by using a hard disk, a solid state drive (SSD), a memory card, a read only memory (ROM), or the like.

The input/output interface 510 is an interface for connecting the computer 500 and an input/output device. For example, an input device such as a keyboard and an output device such as a display device are connected to the input/output interface 510.

The network interface 512 is an interface for connecting the computer 500 to a network. The network may be a local area network (LAN) or may be a wide area network (WAN).

The storage device 508 stores a program (a program that achieves the application described above) that achieves each functional component unit of the display control apparatus 2000. The processor 504 reads the program onto the memory 506 and executes the program, and thus each functional component unit of the display control apparatus 2000 is achieved.

The display control apparatus 2000 may be achieved by one computer 500, or may be achieved by a plurality of the computers 500. In the latter case, configurations of the computers 500 do not need to be the same, and may be different from each other.

<Flow of Processing>

Figure 4:
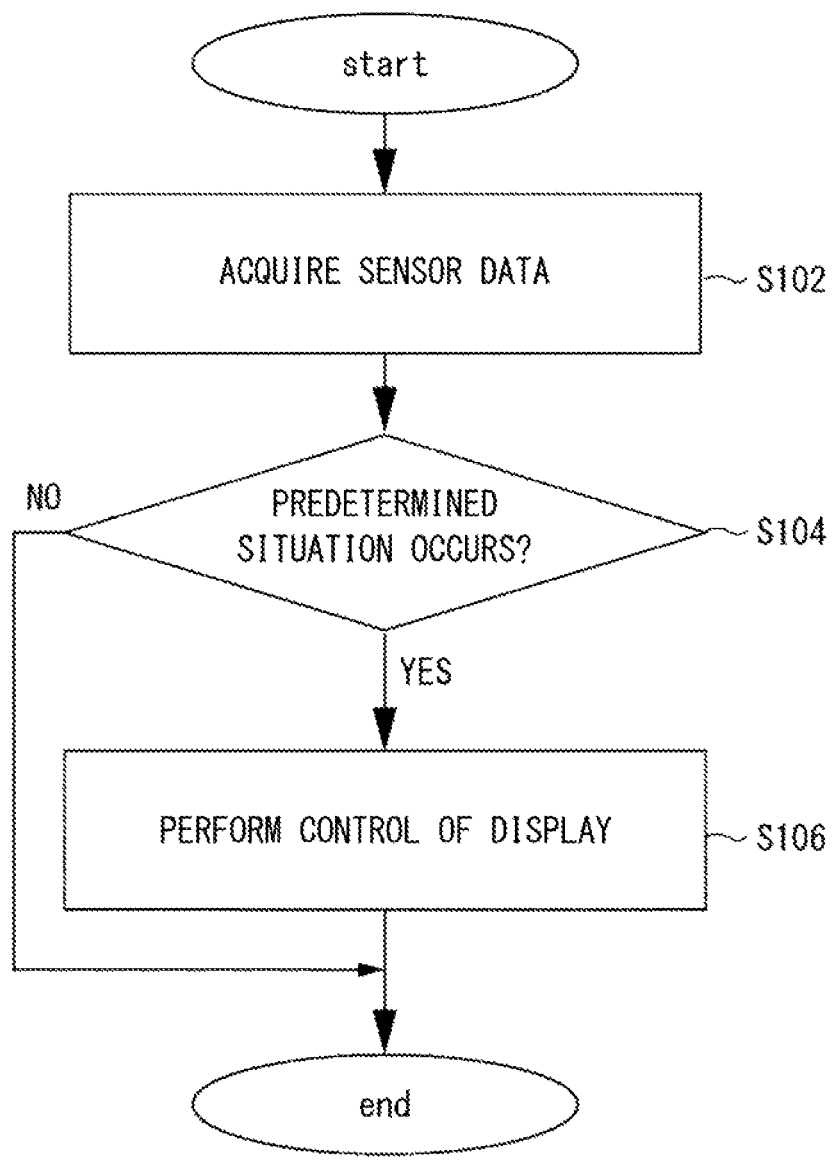
FIG. 4 is a flowchart illustrating a flow of processing performed by the display control apparatus according to the first example embodiment.

FIG. 4 is a flowchart illustrating a flow of processing performed by the display control apparatus 2000 according to the first example embodiment. The detection unit 2020 acquires sensor data of the sensor 20 (S102). The detection unit 2020 determines whether or not a predetermined situation occurs by using the sensor data (S104). When it is determined that the predetermined situation occurs (S104: YES), the state change unit 2040 performs control processing in such a way as to change an output state of target information in the display device (S106).

<Detection of Predetermined Situation>

The detection unit 2020 determines whether or not a predetermined situation occurs by using the sensor data being acquired from the sensor 20. As described above, the predetermined situation is the first situation (situation where there is a risk that the target information being displayed on the display device 10 is viewed by a person other than the specific person 30), or the second situation (situation where there is a risk that the target information being displayed on the display device 10 is captured by a camera). Hereinafter, a method for detecting each of the first situation and the second situation will be exemplified.

<<Method for Detecting First Situation>>

Detection of the first situation can be achieved by detecting presence of a person other than the specific person 30 by using the sensor data being acquired from the sensor 20. Hereinafter, a specific description will be given.

<<<Case where Camera is Used>>>

For example, it is assumed that a camera provided in such a way as to capture surroundings of the display device 10 is used as the sensor 20. In this case, the detection unit 2020 acquires, as the sensor data, image data being generated by the camera. Note that various types of existing methods can be employed as a method for acquiring the image data from the camera.

The camera is provided so that a capturing range thereof includes a place from which the display device 10 can be viewed. The camera may be built in the display device 10, or may be installed around the display device 10.

Note that the image data herein also include a video frame constituting video data. In other words, the sensor data may be still image data being generated by a still camera, or may be video data being generated by a video camera. Further, the camera is not limited to a camera that captures visible light, and may be a camera (for example, an infrared camera) that captures invisible light.

For example, the detection unit 2020 determines that the first situation occurs when the number of persons included in the image data is greater than a predetermined threshold (for example, 1). In this case, the detection unit 2020 determines whether or not the number of the persons included in the image data is greater than the threshold. When the number of the persons included in the image data is greater than the threshold, the detection unit 2020 determines that the first situation occurs. On the other hand, when the number of the persons included in the image data is equal to or less than the threshold, the detection unit 2020 determines that the first situation does not occur.

In another example, the detection unit 2020 determines that the first situation occurs when a person other than the specific person 30 is included in the image data being acquired from the camera. In this case, the detection unit 2020 computes a feature value on the image (hereinafter, an image feature value) for one or more persons included in the image data. The detection unit 2020 compares the image feature value of each person included in the image data with an image feature value of the specific person 30 being stored in advance in a storage device that can be accessed from the detection unit 2020. When the image feature values of the respective persons being detected from the image data includes an image feature value that does not match the image feature value of the specific person 30 (for example, that has a degree of similarity less than a threshold), the detection unit 2020 determines that the first situation occurs. On the other hand, when each of all image feature values of the respective persons being detected from the image data matches the image feature value of the specific person 30 (for example, has a degree of similarity equal to or more than the threshold), the detection unit 2020 determines that the first situation does not occur.

<<<Case where Microphone is Used>>>

A case where a microphone is used as the sensor 20 will be described. In this case, the sensor data are audio data. The microphone is provided in such a way as to detect a sound around the display device 10. Particularly, the microphone is preferably provided in such a way as to detect a sound coming from a direction (front of a display screen of the display device 10) in which a person viewing the display device 10 is located. Note that various types of existing methods can be employed as a method for acquiring the audio data from the microphone.

For example, the detection unit 2020 determines that the first situation occurs when the number of persons whose voice is included in the audio data is greater than a predetermined threshold (for example, 1). In this case, the detection unit 2020 analyzes the audio data being acquired from the microphone, computes the number of the persons whose voice is included in the audio data, and compares the number with the threshold. When the number of the persons whose voice is included in the audio data is greater than the threshold, the detection unit 2020 determines that the first situation occurs. On the other hand, when the number of the persons whose voice is included in the audio data is equal to or less than the threshold, the detection unit 2020 determines that the first situation does not occur.

In another example, the detection unit 2020 determines that the first situation occurs when a voice of a person other than the specific person 30 is included in the audio data. In this case, the detection unit 2020 computes a feature value of a sound (hereinafter, an audio feature value) for a voice of each person included in the audio data. The detection unit 2020 compares the audio feature value of the voice of each person detected in the audio data with an audio feature value of a voice of the specific person 30 being stored in advance in the storage device that can be accessed from the detection unit 2020. When the audio feature values of the voice of respective persons being included in the audio data includes an audio feature value that does not match the audio feature value of the voice of the specific person 30 (for example, that has a degree of similarity less than a threshold), the detection unit 2020 determines that the first situation occurs. On the other hand, when each of all audio feature values of the voice of the respective persons being included in the audio data matches the audio feature value of the voice of the specific person 30 (for example, has a degree of similarity equal to or more than the threshold), the detection unit 2020 determines that the first situation does not occur.

<<Method for Detecting Second Situation>>

Detection of the second situation can be achieved by detecting presence of a camera other than a camera provided as the sensor 20 by using the sensor data being acquired from the sensor 20. For example, it is assumed that a camera is used as the sensor 20. In this case, the detection unit 2020 determines that the second situation occurs when a specific type of an object that may capture the display screen of the display device 10 is included in image data being acquired as the sensor data. The specific type of the object is a camera or an object (for example, a mobile terminal such as a smartphone or a tablet terminal) having a possibility of being provided with a camera. In this case, an image feature value of the specific type of the object is stored in advance in the storage device that can be accessed from the detection unit 2020.

The detection unit 2020 determines whether the image feature value of the specific type of the object is included in the image data being acquired from the camera provided as the sensor 20. When it is determined that the image feature value of the specific type of the object is included, the detection unit 2020 determines that the second situation occurs. On the other hand, when it is determined that the image feature value of the specific type of the object is not included, the detection unit 2020 determines that the second situation does not occur.

<Switching of Specific Person 30>

The specific person 30 may be different for each piece of target information. For example, it is conceivable that a user U1 is the specific person for target information called a file A, and a user U2 is the specific person 30 for target information called a file B. In this case, a pair of identification information of the target information and identification information of the specific person 30 (for example, the image feature value of the specific person 30, or the audio feature value of the voice of the specific person 30 described above) is stored in advance in the storage device that can be accessed from the detection unit 2020. The detection unit 2020 acquires the identification information of the target information being displayed on the display device 10, acquires the identification information of the specific person 30 being associated with the identification information of the target information, and performs detection of a predetermined situation using the acquired identification information of the specific person 30.

<Timing at which Detection of Predetermined Situation is Performed>

The detection unit 2020 may always repeat detection of a predetermined situation (for example, perform detection processing for each predetermined period of time), or may perform detection of a predetermined situation only when a predetermined condition is satisfied. For example, it is assumed that the target information is limited to a part of information instead of all information. In this case, the detection unit 2020 performs processing of detecting a predetermined situation only when the target information is displayed on the display device 10. In this case, identification information about each piece of information (for example, a file) handled as the target information is stored in advance in the storage device that can be accessed from the detection unit 2020. The detection unit 2020 acquires the identification information of each piece of the information being displayed on the display device 10 at a timing at which detection of a predetermined situation is performed, and determines whether or not identification information of the target information is included in the identification information of the respective pieces of the information. When the identification information of the target information is included, the detection unit 2020 performs detection of a predetermined situation. On the other hand, when the identification information of the target information is not included, the detection unit 2020 does not perform detection of a predetermined situation.

Further, while the detection unit 2020 always repeats detection of a predetermined situation, a condition that "target information is displayed on the display device 10" may be added to a condition where a predetermined condition is detected. For example, the detection unit 2020 determines that the first situation occurs when a condition that "target information is displayed on the display device 10 and a person other than the specific person 30 is included in image data being acquired from a camera" is satisfied.

<Change of Output State>

When a predetermined situation is detected, the state change unit 2040 performs the control processing in such a way as to change an output state of the target information on the display device 10. For example, the state change unit 2040 performs the control processing in such a way that all information is not output from the display device 10. In this way, all information being displayed on the display device 10 cannot be viewed, and thus a person other than the specific person 30 cannot view the target information. Further, the target information cannot also be captured by a camera. Such control processing is, for example, processing of turning off the display device 10 or cutting off transmission of screen data to the display device 10.

In another example, the state change unit 2040 performs the control processing in such a way that visibility of information to be output from the display device 10 is lowered. In this way, even when a person other than the specific person 30 views the target information, it can be made difficult to recognize a content of the target information. Similarly, even when the target information is captured by a camera, it can be made difficult to recognize a content of the captured information.

The control processing of lowering visibility of information is, for example, processing of lowering brightness of the display device 10 or processing of adding change to the screen data being displayed on the display device 10. The change added to the screen data is, for example, processing of changing a color tone and the like of the screen data (changing to a darker color as a whole, and the like), processing of superimposing other image data (such as a dot pattern) on the screen data, or processing of adding a change to the screen data according to a predetermined algorithm (adding blurring, and the like).

Note that, when the target information is only a part of information (for example, one of a plurality of files being displayed on the display device 10), the state change unit 2040 may change an output state of only the target information. Such processing is, for example, processing of minimizing a window of the target information, processing of setting the window to be transparent (setting opacity to zero), and the like. Further, the change added to the screen data described above may be applied to only the window of the target information.

There are various targets to which the state change unit 2040 adds control for the control processing described above. For example, the state change unit 2040 controls the hardware of the display device 10. For example, information can be set not to be displayed on the display device 10 by turning off the display device 10, or visibility of information being displayed on the display device 10 can be lowered by lowering brightness of the display device 10. In another example, the state change unit 2040 may control a machine (for example, a PC operated by the specific person 30) that is connected to the display device 10 and outputs the screen data to the display device 10. For example, the processing of cutting off an output of the screen data to the display device 10 or adding a change to the screen data can be performed by a program (for example, a device driver) in an operating system operating on a machine that outputs the screen data.

Figure 5:
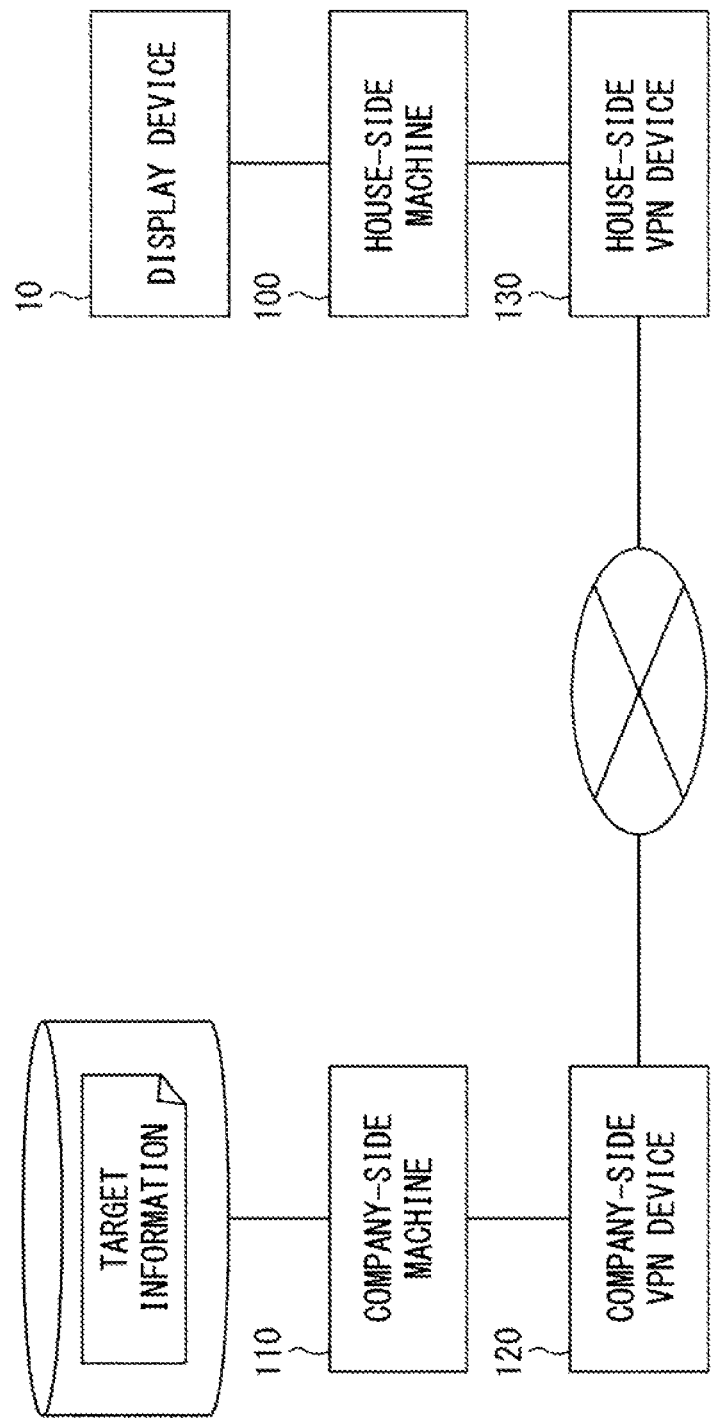
FIG. 5 is a diagram illustrating a case where target information is provided via a network.

In another example, when the target information is data provided via a network, the state change unit 2040 may control communication via the network. FIG. 5 is a diagram illustrating a case where the target information is provided via a network. In FIG. 5, the target information is a file in a company-side machine 110. The specific person 30 is remotely connected from a house-side machine 100 to the company-side machine 110 via a virtual private network (VPN). VPN connection is achieved by a company-side VPN device 120 installed in a company and a house-side VPN device 130 installed in a house of the specific person 30.

In this case, screen data being generated by the company-side machine 110 are transmitted to the house-side machine 100 via the company-side VPN device 120 and the house-side VPN device 130. Then, the screen data are output from the house-side machine 100 to the display device 10. Then, the control processing described above can be achieved by cutting off transmission of the screen data or adding change to the screen data in the company-side machine 110, the company-side VPN device 120, or the house-side VPN device 130.

For example, in this case, the company-side machine 110, the company-side VPN device 120, or the house-side VPN device 130 functions as the display control apparatus 2000. In this case, the sensor data are set to be transmitted from the sensor 20 to the devices.

Further, the function of the detection unit 2020 may be provided in the house-side machine 100, and the function of the state change unit 2040 may be provided in the company-side machine 110, the company-side VPN device 120, or the house-side VPN device 130. In this case, the house-side machine 100 performs detection of a predetermined situation, and notifies the device provided with the function of the state change unit 2040 that the predetermined situation is detected. Then, the device that receives the notification performs the processing of controlling display.

Although the invention of the present application has been described with reference to the example embodiments, it should be understood that the invention of the present application is not limited to the above-described example embodiments. Various modifications that can be understood by those skilled in the art can be made to the configuration and the details of the invention of the present application within the scope of the invention of the present application.

Note that, in the example described above, the program may be stored by using various types of non-transitory computer readable mediums, and may be provided to a computer. The non-transitory computer readable medium includes various types of tangible storage mediums. Examples of the non-transitory computer readable medium include a magnetic recording medium (for example, a flexible disk, a magnetic tape, and a hard disk drive), a magneto-optical recording medium (for example, a magneto-optical disk), a CD-ROM, a CD-R, a CD-R/W, and a semiconductor memory (for example, a mask ROM, a programmable ROM (PROM), an erasable PROM (EPROM), a flash ROM, and a RAM). Further, the program may be provided to the computer by various types of transitory computer readable mediums. Examples of the transitory computer readable medium include an electrical signal, an optical signal, and an electromagnetic wave. The transitory computer readable medium may supply the program to the computer via a wired communication path such as an electric wire and an optical fiber or a wireless communication path.

A part or the whole of the above-described example embodiments may also be described as in supplementary notes below, which is not limited thereto.

(Supplementary Note 1)

A display control apparatus comprising:
    a detection unit configured to detect, by using audio data including a sound around a display device, a first situation in which target information being displayed by the display device can be viewed by a person other than a specific person, or detect, by using image data including surroundings of the display device, a second situation in which the target information being displayed by the display device can be captured by a camera; and
    a state change unit configured to change an output state of the target information in the display device in response to detection of the first situation or the second situation,
    wherein a change of the output state is processing of stopping output of the target information or processing of reducing visibility of the target information as compared with visibility before the change.

(Supplementary Note 2)

The display control apparatus according to Supplementary note 1, wherein the detection unit determines that the first situation occurs when a number of persons whose voices are detected from the audio data is larger than or equal to a predetermined threshold or when a voice with an audio feature value that does not match an audio feature value of a voice of the specific person is detected from the audio data.

(Supplementary Note 3)

The display control apparatus according to Supplementary note 2, wherein the detection unit performs:
acquiring the audio feature value of the specific person corresponding to the target information displayed on the display device from a storage device that is configured to store a plurality of associations between the target information and the audio feature value of the specific person; and
detecting the first situation when an audio feature value that does not match the acquired audio feature value of the specific person is included in the audio data.

(Supplementary Note 4)

The display control apparatus according to Supplementary note 1, wherein the detection unit determines that the second situation occurs when an image feature value of a specific type of an object that can capture the target information being displayed by the display device is detected from the image data.

(Supplementary Note 5)

The display control apparatus according to any one of Supplementary notes 1 to 4, wherein the detection unit performs detection of the first situation or the second situation only when the target information is displayed by the display device.

(Supplementary Note 6)

The display control apparatus according to any one of Supplementary notes 1 to 5, wherein processing of reducing visibility of the target information is processing of lowering brightness of the display device or processing of adding change to screen data to be output to the display device.

(Supplementary Note 7)

The display control apparatus according to any one of Supplementary notes 1 to 6,
wherein the display device displays screen data that is transmitted via a network, and
wherein the state change unit performs processing of cutting off transmission of the screen data or adding change to the screen data in a device being a transmission source of the screen data or in a device configured to relay transmission of the screen data from the device being the transmission source.

(Supplementary Note 8)

The display control apparatus according to any one of Supplementary notes 1 to 7, wherein the display control apparatus is provided inside the display device.

(Supplementary Note 9)

A display control method to be executed by a computer, comprising:
a detection step of detecting, by using audio data including a sound around a display device, a first situation in which target information being displayed by the display device can be viewed by a person other than a specific person, or detecting, by using image data including surroundings of the display device, a second situation in which the target information being displayed by the display device can be captured by a camera; and
a state change step of changing an output state of the target information in the display device in response to detection of the first situation or the second situation,
wherein a change of the output state is processing of stopping output of the target information or processing of reducing visibility of the target information as compared with visibility before the change.

(Supplementary Note 10)

The display control method according to Supplementary note 9, further comprising, in the detection step, determining that the first situation occurs when a number of persons whose voices are detected from the audio data is larger than or equal to a predetermined threshold or when a voice with an audio feature value that does not match an audio feature value of a voice of the specific person is detected from the audio data.

(Supplementary Note 11)

The display control method according to Supplementary note 10, further comprising, in the detection step:
acquiring the audio feature value of the specific person corresponding to the target information displayed on the display device from a storage device that is configured to store a plurality of associations between the target information and the audio feature value of the specific person; and
detecting the first situation when an audio feature value that does not match the acquired audio feature value of the specific person is included in the audio data.

(Supplementary Note 12)

The display control method according to Supplementary note 9, further comprising, in the detection step, determining that the second situation occurs when an image feature value of a specific type of an object that can capture the target information being displayed by the display device is detected from the image data.

(Supplementary Note 13)

The display control method according to any one of Supplementary notes 9 to 12, further comprising, in the detection step, performing detection of the first situation or the second situation only when the target information is displayed by the display device.

(Supplementary Note 14)

The display control method according to any one of Supplementary notes 9 to 13, wherein processing of reducing visibility of the target information is processing of lowering brightness of the display device or processing of adding change to screen data to be output to the display device.

(Supplementary Note 15)

The display control method according to any one of Supplementary notes 9 to 14,
wherein the display device displays screen data that is transmitted via a network, and
wherein the display control method further comprising, in the state change step, performing processing of cutting off transmission of the screen data or adding change to the screen data in a device being a transmission source of the screen data or in a device configured to relay transmission of the screen data from the device being the transmission source.

(Supplementary Note 16)

The display control method according to any one of Supplementary notes 9 to 15, wherein the computer is provided inside the display device.

(Supplementary Note 17)

A computer readable medium storing a program that causes a computer to execute:
a detection step of detecting, by using audio data including a sound around a display device, a first situation in which target information being displayed by the display device can be viewed by a person other than a specific person, or detecting, by using image data including surroundings of the display device, a second situation in which the target information being displayed by the display device can be captured by a camera; and a state change step of changing an output state of the target information in the display device in response to detection of the first situation or the second situation, wherein a change of the output state is processing of stopping output of the target information or processing of reducing visibility of the target information as compared with visibility before the change.

(Supplementary Note 18)

The computer readable medium according to Supplementary note 17, wherein the detection step includes determining that the first situation occurs when a number of persons whose voices are detected from the audio data is larger than or equal to a predetermined threshold or when a voice with an audio feature value that does not match an audio feature value of a voice of the specific person is detected from the audio data.

(Supplementary Note 19)

The computer readable medium according to Supplementary note 18, wherein the detection step includes:

acquiring the audio feature value of the specific person corresponding to the target information displayed on the display device from a storage device that is configured to store a plurality of associations between the target information and the audio feature value of the specific person; and detecting the first situation when an audio feature value that does not match the acquired audio feature value of the specific person is included in the audio data.

(Supplementary Note 20)

The computer readable medium according to Supplementary note 17, wherein the detection step includes determining that the second situation occurs when an image feature value of a specific type of an object that can capture the target information being displayed by the display device is detected from the image data.

(Supplementary Note 21)

The computer readable medium according to any one of Supplementary notes 17 to 20, wherein the detection step includes performing detection of the first situation or the second situation only when the target information is displayed by the display device.

(Supplementary Note 22)

The computer readable medium according to any one of Supplementary notes 17 to 21, wherein processing of reducing visibility of the target information is processing of lowering brightness of the display device or processing of adding change to screen data to be output to the display device.

(Supplementary Note 23)

The computer readable medium according to any one of Supplementary notes 17 to 22, wherein the display device displays screen data that is transmitted via a network, and wherein the state change step includes performing processing of cutting off transmission of the screen data or adding change to the screen data in a device being a transmission source of the screen data or in a device configured to relay transmission of the screen data from the device being the transmission source.

(Supplementary Note 24)

The computer readable medium according to any one of Supplementary notes 17 to 23, wherein the computer is provided inside the display device.

REFERENCE SIGNS LIST

10 DISPLAY DEVICE
20 SENSOR
30 SPECIFIC PERSON
100 HOUSE-SIDE MACHINE
110 COMPANY-SIDE MACHINE
120 DEVICE
130 DEVICE
500 COMPUTER
502 BUS
504 PROCESSOR
506 MEMORY
508 STORAGE DEVICE
510 INPUT/OUTPUT INTERFACE
512 NETWORK INTERFACE
2000 DISPLAY CONTROL APPARATUS
2020 DETECTION UNIT
2040 STATE CHANGE UNIT

What is claimed is:

1. A display control apparatus comprising:
at least one memory that is configured to store instructions; and
at least one processor that is configured to execute the instructions to:
detect a first situation using audio data including a sound around a display device or detect a second situation using image data including surroundings of the display device, the first situation being a situation in which target information being displayed by the display device can be viewed by a person other than a specific person, the second situation being a situation in which the target information being displayed by the display device can be captured by a camera; and
change an output state of the target information in the display device in response to detection of the first situation or the second situation,
wherein a change of the output state is processing of stopping output of the target information or processing of reducing visibility of the target information as compared with visibility before the change,
wherein the display device displays screen data that is transmitted via a network, and
wherein the change of the output state of the target information includes cutting off transmission of the screen data or adding change to the screen data in a relay device configured to relay transmission of the screen data from the device being a transmission source.

2. The display control apparatus according to claim 1, wherein the detection of the first situation includes determining that the first situation occurs when a number of persons whose voices are detected from the audio data is larger than or equal to a predetermined threshold or when a voice with an audio feature value that does not match an audio feature value of a voice of the specific person is detected from the audio data.

3. The display control apparatus according to claim 2, wherein the detection of the first situation includes:
acquiring the audio feature value of the specific person corresponding to the target information displayed on the display device from a storage device that is configured to store a plurality of associations between the target information and the audio feature value of the specific person; and detecting the first situation when an audio feature value that does not match the acquired audio feature value of the specific person is included in the audio data.

4. The display control apparatus according to claim 1, wherein the detection of the second situation includes determining that the second situation occurs when an image feature value of a specific type of an object that can capture the target information being displayed by the display device is detected from the image data.

5. The display control apparatus according to claim 1, wherein the detection of the first situation or the second situation is performed only when the target information is displayed by the display device.

6. The display control apparatus according to claim 1, wherein processing of reducing visibility of the target information is processing of lowering brightness of the display device or processing of adding change to screen data to be output to the display device.

7. The display control apparatus according to claim 1, wherein the display control apparatus is provided inside the display device.

8. The display control apparatus according to claim 1,
wherein the transmission source and the display device are connected to each other via a virtual private network, and
wherein the relay device servers as an intermediary for communication over the virtual private network between the transmission source and the display device.

9. A display control method to be executed by a computer, comprising:
detecting a first situation using audio data including a sound around a display device or detecting a second situation using image data including surroundings of the display device, the first situation being a situation in which target information being displayed by the display device can be viewed by a person other than a specific person, the second situation being a situation in which the target information being displayed by the display device can be captured by a camera; and
changing an output state of the target information in the display device in response to detection of the first situation or the second situation,
wherein a change of the output state is processing of stopping output of the target information or processing of reducing visibility of the target information as compared with visibility before the change,
wherein the display device displays screen data that is transmitted via a network, and
wherein the change of the output state of the target information includes cutting off transmission of the screen data or adding change to the screen data in a relay device configured to relay transmission of the screen data from the device being a transmission source.

10. The display control method according to claim 9, wherein the detection of the first situation includes determining that the first situation occurs when a number of persons whose voices are detected from the audio data is larger than or equal to a predetermined threshold or when a voice with an audio feature value that does not match an audio feature value of a voice of the specific person is detected from the audio data.

11. The display control method according to claim 10, wherein the detection of the first situation includes:
acquiring the audio feature value of the specific person corresponding to the target information displayed on the display device from a storage device that is configured to store a plurality of associations between the target information and the audio feature value of the specific person; and
detecting the first situation when an audio feature value that does not match the acquired audio feature value of the specific person is included in the audio data.

12. The display control method according to claim 9, wherein the detection of the second situation includes determining that the second situation occurs when an image feature value of a specific type of an object that can capture the target information being displayed by the display device is detected from the image data.

13. The display control method according to claim 9, wherein the detection of the first situation or the second situation is performed only when the target information is displayed by the display device.

14. The display control method according to claim 9, wherein processing of reducing visibility of the target information is processing of lowering brightness of the display device or processing of adding change to screen data to be output to the display device.

15. The display control method according to claim 9, wherein the computer is provided inside the display device.

16. The display control method according to claim 9,
wherein the transmission source and the display device are connected to each other via a virtual private network, and
wherein the relay device servers as an intermediary for communication over the virtual private network between the transmission source and the display device.

17. A non-transitory computer readable medium storing a program that causes a computer to execute:
detecting a first situation using audio data including a sound around a display device or detecting a second situation using image data including surroundings of the display device, the first situation being a situation in which target information being displayed by the display device can be viewed by a person other than a specific person, the second situation being a situation in which the target information being displayed by the display device can be captured by a camera; and
changing an output state of the target information in the display device in response to detection of the first situation or the second situation,
wherein a change of the output state is processing of stopping output of the target information or processing of reducing visibility of the target information as compared with visibility before the change,
wherein the display device displays screen data that is transmitted via a network, and
wherein the change of the output state of the target information includes cutting off transmission of the screen data or adding change to the screen data in a relay device configured to relay transmission of the screen data from the device being a transmission source.

18. The computer readable medium according to claim 17, wherein the detection of the first situation includes determining that the first situation occurs when a number of persons whose voices are detected from the audio data is larger than or equal to a predetermined threshold or when a voice with an audio feature value that does not match an audio feature value of a voice of the specific person is detected from the audio data.

19. The computer readable medium according to claim 18, wherein the detection of the first situation includes:
    acquiring the audio feature value of the specific person corresponding to the target information displayed on the display device from a storage device that is configured to store a plurality of associations between the target information and the audio feature value of the specific person; and
    detecting the first situation when an audio feature value that does not match the acquired audio feature value of the specific person is included in the audio data.

20. The computer readable medium according to claim 17, wherein the detection of the second situation includes determining that the second situation occurs when an image feature value of a specific type of an object that can capture the target information being displayed by the display device is detected from the image data.

21. The computer readable medium according to claim 17, wherein the detection of the first situation or the second situation is performed only when the target information is displayed by the display device.

22. The computer readable medium according to claim 17, wherein processing of reducing visibility of the target information is processing of lowering brightness of the display device or processing of adding change to screen data to be output to the display device.

23. The computer readable medium according to claim 17, wherein the computer is provided inside the display device.

24. The computer readable medium according to claim 17,
    wherein the transmission source and the display device are connected to each other via a virtual private network, and
    wherein the relay device servers as an intermediary for communication over the virtual private network between the transmission source and the display device.

* * * * *